US008102788B2

(12) United States Patent
Zhang et al.

(10) Patent No.: US 8,102,788 B2
(45) Date of Patent: Jan. 24, 2012

(54) METHOD AND WIRELESS TRANSMIT/RECEIVE UNIT FOR SUPPORTING AN ENHANCED UPLINK DEDICATED CHANNEL INTER-NODE-B SERVING CELL CHANGE

(75) Inventors: Guodong Zhang, Farmingdale, NY (US); Stephen E. Terry, Northport, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 777 days.

(21) Appl. No.: 10/945,355

(22) Filed: Sep. 20, 2004

(65) Prior Publication Data

US 2005/0094586 A1    May 5, 2005

Related U.S. Application Data

(60) Provisional application No. 60/517,694, filed on Nov. 5, 2003.

(51) Int. Cl.
*G08C 17/00* (2006.01)

(52) U.S. Cl. ........ 370/311; 370/328; 370/332; 455/436; 455/439

(58) Field of Classification Search .................. 370/331; 714/749, 748
See application file for complete search history.

(56) References Cited

U.S. PATENT DOCUMENTS

| | | | |
|---|---|---|---|
| 6,640,105 B1 | 10/2003 | Shin | |
| 6,678,523 B1 * | 1/2004 | Ghosh et al. ................. | 455/442 |
| 6,865,163 B1 * | 3/2005 | Bergenwall et al. .......... | 370/288 |
| 2001/0012279 A1 * | 8/2001 | Haumont et al. .............. | 370/331 |
| 2001/0036823 A1 | 11/2001 | Van Lieshout et al. | |
| 2003/0007480 A1 * | 1/2003 | Kim et al. ...................... | 370/349 |
| 2003/0031119 A1 * | 2/2003 | Kim et al. ...................... | 370/200 |
| 2004/0192308 A1 * | 9/2004 | Lee et al. ....................... | 455/436 |
| 2004/0219917 A1 * | 11/2004 | Love et al. ..................... | 455/436 |
| 2004/0219920 A1 * | 11/2004 | Love et al. ..................... | 455/442 |
| 2004/0228313 A1 * | 11/2004 | Cheng et al. ................... | 370/342 |
| 2006/0092973 A1 * | 5/2006 | Petrovic et al. ................ | 370/469 |

(Continued)

OTHER PUBLICATIONS

3GPP2 C.S0002-C, "Physical Layer Standard for cdma2000 Spread Spectrum Systems", 3rd Generation Partnership Project 2 "3GPP2", Version 2.0, Revision C, Jul. 23, 2004.

(Continued)

*Primary Examiner* — Charles Appiah
*Assistant Examiner* — Mazda Sabouri
(74) *Attorney, Agent, or Firm* — Volpe and Koenig, P.C.

(57) ABSTRACT

A wireless communication method and system for supporting an enhanced uplink dedicated channel (EU-DCH) inter-Node-B serving cell change. The system includes at least one wireless transmit/receive unit (WTRU) for transmitting data blocks, a target Node-B, a source Node-B and a serving radio network controller (S-RNC). The S-RNC includes a re-ordering buffer which stores data blocks correctly received from the WTRU. The S-RNC informs the target Node-B of a need for an EU-DCH inter-Node-B serving cell change from the source Node-B to the target Node-B. A medium access control (MAC) entity that handles EU-DCH functionalities is set up in the target Node-B. Hybrid automatic repeat request (HARQ) processes and transmission sequence numbers (TSNs) are not reset at the WTRU. Using a new data indicator, the WTRU transmits a data block to the target Node-B that was previously transmitted to the source Node-B, but was not correctly received by the source Node-B.

4 Claims, 6 Drawing Sheets

U.S. PATENT DOCUMENTS

2006/0140115 A1* 6/2006 Timus et al. .................. 370/230
2007/0008990 A1* 1/2007 Torsner ......................... 370/473

OTHER PUBLICATIONS

3GPP2 C.20003-C, "Medium Access Control (MAC) Standard for cdma2000 Spread Spectrum Systems", 3$^{rd}$ Generation Partnership Project 2 "3GPP2", Version 2.0, Release C, Aug. 2004.

3GPP2 C.S0004-C, "Signaling Link Access Control (LAC) Standard for cdma2000 Spread Spectrum Systems", 3$^{rd}$ Generation Partnership Project 2 "3GPP2", Version 2.0, Revision C, Jul. 23, 2004.

3GPP2 C.S0005-C, "Upper Layer (Layer 3) Signaling Standard for cdma2000 Spread Spectrum Systems", 3$^{rd}$ Generation Partnership Project 2 "3GPP2", Version 2.0, Revision c, Jul. 23, 2004.

3GPP TS 25.308, "Technical Specification Group Radio Access Network", 3$^{rd}$ Generation Partnership Project; High Speed Downlink Packet Access (HSDPA); Overall description; Stage 2, (Release 5), Version 5.4.0 (Mar. 2003).

3GPP TS 25.308, "Technical Specification Group Radio Access Network", 3$^{rd}$ Generation Partnership Project; High Speed Downlink Packet Access (HSDPA); Overall description; Stage 2, (Release 6), Version 6.2.0 (Sep. 2004).

3GPP TS 25.309, "Technical Specification Group. Radio Access Network"; 3rd Generation Partnership Project; FDD Enhanced Uplink; Overall description; Stage 2 (Release 6) Version 1.0.0 (Sep. 2004).

3GPP TS 25.309, "Technical Specification Group Radio Access Network"; 3rd Generation Partnership Project; FDD Enhanced Uplink; Overall description; Stage 2 (Release 6) Version 6.0.0 (Sep. 2004).

3GPP TS 25.321, "Technical Specification Group Radio Access Network", 3$^{rd}$ Generation Partnership Project; Medium Access Control (MAC) protocol specification (Release 5), Version 5.6.0 (Sep. 2003).

3GPP TS 25.321, "Technical Specification Group Radio Access Network", 3$^{rd}$ Generation Partnership Project; Medium Access Control (MAC) protocol specification (Release 6), Version 6.2.0 (Jun. 2004).

3GPP, "3$^{rd}$ Generation Partnership Project; Technical Support Group Radio Access Network; MAC Protocol Specification (Release 1999)," 3GPP TS 25.321 v3.16.0 (Sep. 2003).

3GPP, "3$^{rd}$ Generation Partnership Project; Technical Support Group Radio Access Network; MAC Protocol Specification (Release 1999)," 3GPP TS 25.321 v3.17.0 (Jun. 2004).

3GPP, "3$^{rd}$ Generation Partnership Project; Technical Support Group Radio Access Network; MAC Protocol Specification (Release 4)," 3GPP TS 25.321 v4.9.0 (Sep. 2009).

3GPP, "3$^{rd}$ Generation Partnership Project; Technical Support Group Radio Access Network; MAC Protocol Specification (Release 4)," 3GPP TS 25.321 v4.10.0 (Jun. 2004).

3GPP, "3$^{rd}$ Generation Partnership Project; Technical Support Group Radio Access Network; MAC Protocol Specification (Release 5)," 3GPP TS 25.321 v5.9.0 (Jun. 2004).

3GPP, "3$^{rd}$ Generation Partnership Project; Technical Support Group Radio Access Network; High Speed Downlink Packet Access (HSDPA); Overall Description; Stage 2 (Release 6)," 3GPP TS 25.308 V6.1.0 (Mar. 2004).

* cited by examiner

METHOD AND WIRELESS TRANSMIT/RECEIVE UNIT FOR SUPPORTING AN ENHANCED UPLINK DEDICATED CHANNEL INTER-NODE-B SERVING CELL CHANGE

CROSS REFERENCE TO RELATED APPLICATION

This application claims priority from U.S. Provisional Patent Application Ser. No. 60/517,694, filed Nov. 5, 2003, which is incorporated by reference as if fully set forth herein.

FIELD OF THE INVENTION

The present invention relates to the field of wireless communications. More specifically, the present invention relates to efficiently implementing an enhanced uplink dedicated channel (EU-DCH) inter-Node-B serving cell change in a multi-cell wireless communication system, such as a frequency division duplex (FDD) or time division duplex (TDD) system.

BACKGROUND

Methods for improving uplink coverage, throughput and transmission latency are currently being investigated in third generation partnership project (3 GPP) in the context of the Release 6 (R6) universal mobile telecommunications system (UMTS) study item "FDD uplink enhancements".

It is widely anticipated that in order to achieve these goals, Node-B (base station) will take over the responsibility of scheduling and assigning uplink resources (physical channels) to users. The principle is that Node-B can make more efficient decisions and manage uplink radio resources on a short-term basis better than the Radio Network Controller (RNC), even if the RNC retains coarse overall control. A similar approach has already been adopted in the downlink for Release 5 (R5) high speed downlink packet access (HSDPA) in both UMTS FDD and TDD modes.

It is also envisioned there could be several independent uplink transmissions processed between a wireless transmit/receive unit (WTRU) and a universal terrestrial radio access network (UTRAN) within a common time interval. One example of this would be medium access control (MAC) layer hybrid automatic repeat request (HARQ) or simply MAC layer automatic repeat request (ARQ) operation where each individual transmission may require a different number of retransmissions to be successfully received by UTRAN. To limit the impact on system architecture, it is expected that protocol layers above the MAC should not be affected by introduction of the EU-DCH. One requirement that is introduced by this is the in-sequence data delivery to the radio link control (RLC) protocol layer. Therefore, similar to HSDPA operation in the downlink, a UTRAN re-ordering function is needed to organize the received data blocks according to the sequence generated by the WTRU RLC entity.

In a conventional wireless communication system based on downlink HSDPA operation, new MAC entities for the EU-DCH in the WTRU and Node B are required. The Node B MAC entity would be responsible for scheduling and assignment of physical resources, and the re-ordering function would be incorporated in the system for in-sequence delivery to the RNC.

FIG. 1 is a signal flow diagram depicting the operation of a conventional wireless communication system 100 in which out-of-sequence delivery to an RLC entity in the serving-RNC (S-RNC) and RLC recovery occur on the WTRU side during an EU-DCH inter-Node-B serving cell change. The wireless communication system 100 includes a WTRU 105, a target Node-B 110, a source Node-B 115 and an S-RNC 120.

Still referring to FIG. 1, when the S-RNC 120 realizes a need for an EU-DCH inter-Node-B serving cell change (step 125), the S-RNC sends an Iub request message 130 to the target Node-B 110. The target Node-B 110 is informed of the EU-DCH inter-Node-B serving cell change and a MAC entity is set up (step 135). The target Node-B sends an Iub response message 140 to the S-RNC 120 which, in turn, sends a radio resource control (RRC) request message 145 to the WTRU 105. The EU-DCH inter-Node-B serving cell change is realized in the WTRU 105, whereby HARQ processes and transmission sequence numbers (TSNs) are reset (step 150). The WTRU 105 then sends an RRC complete message 155 to the S-RNC 120 which, in turn, sends an Iub request message 160 to the source Node-B 115. The source Node-B 115 is informed of the EU-DCH inter-Node-B serving cell change and the re-ordering buffer is flushed (step 165). The source Node-B then sends an Iub response message 170 to the S-RNC and an out-of-sequence delivery message 175 to the RLC in the S-RNC 120. An RLC status report message 180 is then sent from the S-RNC 120 to the WTRU 105 to initiate an RLC recovery process 185.

Since the EU-DCH inter-Node-B serving cell change results in switching from one Node-B to another, and the re-ordering queue status is only known to the source Node-B, it is necessary to reset the HARQ processes and TSNs in the WTRU 105, and flush the re-ordering queues in the source Node-B 115. This results in out-of-sequence delivery to higher layers and significant delay in recovering data lost in the WTRU 105.

An example of out-of-sequence delivery to RLC and RLC recoveries caused EU-DCH inter-Node-B serving cell change in the conventional wireless communication system 200 is shown in FIG. 2. The wireless communication system 200 includes a WTRU 205, a target Node-B 210, a source Node-B 215 and an S-RNC 220.

Before the EU serving cell is changed, protocol data units (PDUs) with sequence numbers (SNs) 1-5 are sent from a data buffer 225, located in the WTRU 205, to the source Node-B 215. However, in the example shown in FIG. 2, only the PDU with SNs 1, 3 and 4 are received correctly by the source Node-B 215 and stored in a re-ordering buffer 230 in the source Node-B 215. Thus, in this example, the PDUs with SNs 2 and 5 are missing.

Still referring to FIG. 2, after the EU serving cell is changed, the HARQ processes and SNs in the WTRU 205 are reset (step 235), and the re-ordering buffer 230 in the source Node-B 215 is flushed (step 240). In step 245, an out-of-sequence delivery, (i.e., PDUs 1, 3, 4), to the RLC in the S-RNC 220 occurs. The RLC in the S-RNC 220 then generates a first RLC status report message 250 requesting PDUs associated with the old SN 2. The terminology "old" refers to the fact that the PDU with SN 2 is missing in the source Node-B 215 before handover. In response to receiving the message 250, the WTRU 205 transmits the PDUs, associated with the old SN 2, with a new SN 1 to a re-ordering buffer 285 in the target Node-B 210 (step 285). Additionally, the WTRU 205 transmits the PDUs, associated with the old SN 6, with a new SN 2 to the re-ordering buffer 285 in the target Node-B 210 (step 258). The new SN 1 and SN 2 are then forwarded to the RLC in the S-RNC 220 (respective steps 285 and 285). In step 285, an out-of-sequence delivery to the RLC in the S-RNC 220 occurs again. The RLC in the S-RNC 220 then generates a second RLC status report message 285 requesting PDUs associated with the old SN 5. In response to receiving the message 285, the WTRU 205 transmits the PDUs, associated with the old SN 5, with a new SN 3 to a re-ordering buffer 285 in the target Node-B 210 (step 290). The new SN 3 is then forwarded to the RLC in the S-RNC 220 (step 295).

The conventional systems 100, 200, shown in FIGS. 1 and 2, respectively, experience significant delays due to flushing a re-ordering buffer and recovering PDUs from the WTRUs 105, 205. It is desired to reduce such delays.

SUMMARY

A wireless communication method and system for supporting an EU-DCH inter-Node-B serving cell change. The system includes at least one wireless transmit/receive unit (WTRU) for transmitting data blocks, a target Node-B, a source Node-B and a serving radio network controller (S-RNC). The S-RNC includes a re-ordering buffer used for storing data blocks correctly received by the source Node-B and the target Node-B from the WTRU. The S-RNC sends an Iub request message to the target Node-B informing the target Node-B of a need for an EU-DCH inter-Node-B serving cell change from the source Node-B to the target Node-B. A MAC entity that handles EU-DCH functionalities is set up in the target Node-B, and the target Node-B sends an Iub response message back to the S-RNC. The S-RNC then sends a radio resource control (RRC) request message to the WTRU. The WTRU then sends an RRC complete message to the S-RNC.

Before the EU-DCH serving cell change takes place, a MAC entity that handles EU-DCH functionalities may be set up in the target Node-B. The WTRU then sends an RRC message to the S-RNC indicating that the EU-DCH serving cell change has been completed. The S-RNC may send an Iub request message to the source Node-B indicating that the EU-DCH serving cell change has been completed. The MAC entity that handles EU-DCH functionalities in the source Node-B may be released and the source Node-B may send an Iub response message to the S-RNC in response to the Iub Request message. After the EU-DCH inter-Node-B serving cell change is completed, if there is any data block that was previously transmitted by the WTRU to the source Node-B that was not successfully acknowledged, the WTRU transmits it using a new data indicator to the target Node-B. The target Node-B may forward the data block to the re-ordering buffer in the S-RNC.

BRIEF DESCRIPTION OF THE DRAWING(S)

A more detailed understanding of the invention may be had from the following description, given by way of example and to be understood in conjunction with the accompanying drawings wherein.

DETAILED DESCRIPTION OF THE PREFERRED EMBODIMENT(S)

Figure 1:
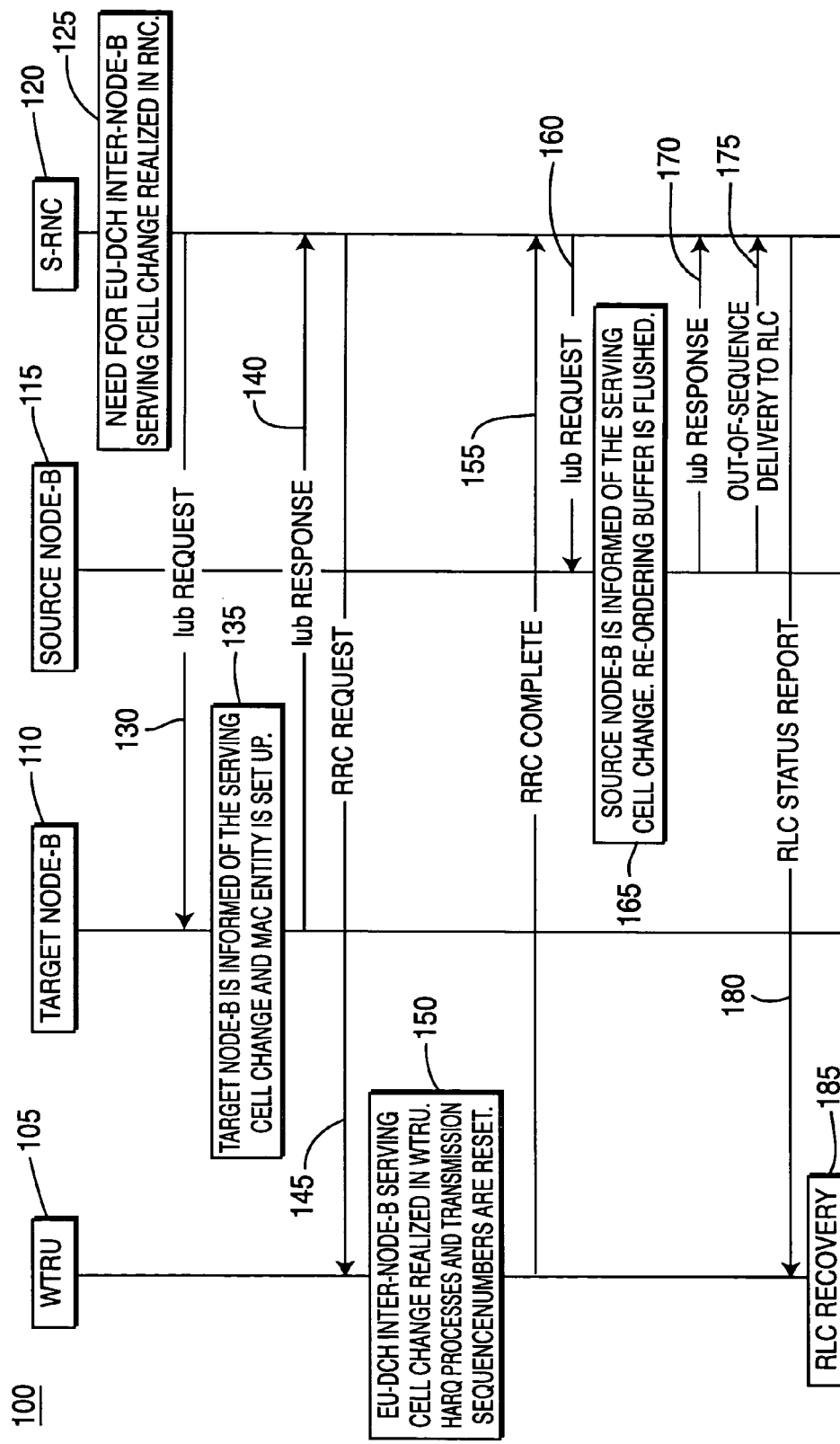
FIGS. 1 and 2 are signal flow diagrams depicting the operation of conventional wireless communication systems in which out-of-sequence delivery to the RLC and RLC recovery occur during an EU serving cell change.

The preferred embodiments will be described with reference to the drawing figures where like numerals represent like elements throughout.

Hereafter, the terminology "WTRU" includes but is not limited to a user equipment, a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The present invention is applicable to any type of wireless communication systems such as UMTS-TDD and FDD, time division synchronous code division multiple access (TD-SCDMA), code division multiple access 2000 (CDMA 2000), and CDMA in general or any other type of wireless communication system. With respect to CDMA 2000, the present invention may be implemented in EV-DO (i.e. data only) and EV-DV (i.e. data and voice).

The present invention implements a re-ordering function for EU at the RNC. With the proper implementation of re-ordering function, HARQ processes and TSNs do not need to be reset in the WTRU, and the re-ordering buffer does not need to be flushed during an EU-DCH inter-Node-B serving cell change. This helps to avoid the loss of MAC data and RLC recoveries during an EU-DCH inter-Node-B serving cell change and reduces transmission delay.

In its transmission to the new target Node-B, the WTRU sets a "new data indicator" for data blocks that are not acknowledged (ACK) by the source Node-B by the time of EU-DCH inter-Node-B serving cell change, and the WTRU should resume the same sequence numbers for data blocks from where it stopped in the source Node-B. By moving the re-ordering buffers to the RNC, transmission sequence can be maintained across Node-B's. Transmission sequence and re-ordering are not affected by the change of Node-B's.

Figure 3:
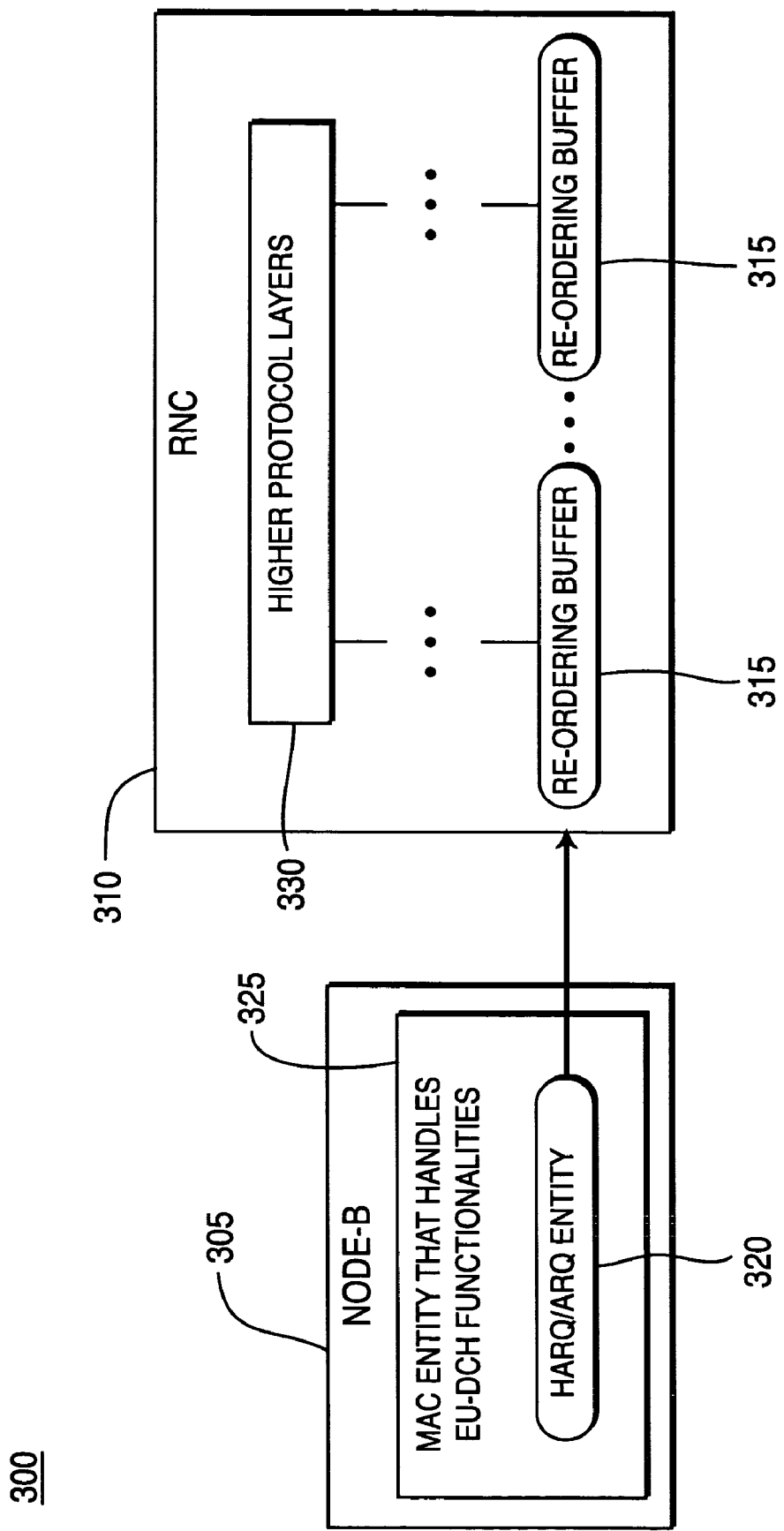
FIG. 3 shows a wireless communication system in which a Node-B communicates with an RNC having a re-ordering buffer located therein in accordance with the present invention.

FIG. 3 shows the architecture of a wireless communication system 300 including a Node-B 305 and an RNC 310 operating in accordance with the present invention. At least one re-ordering buffer 315 exists within the RNC 310. An HARQ/ARQ entity 320 for EU-DCH is located at the Node-B 305 within a MAC entity 325 that handles EU-DCH functionalities. If a data block is decoded successfully at the Node-B 305, it is forwarded to the re-ordering buffer 315 in the RNC 310. The re-ordering buffer 315 performs a re-ordering function for data blocks correctly received from the Node-B 305 so as to support in-sequence delivery to higher protocol layers 330 of the RNC 310.

The WTRU will maintain TSNs used in the source cell. Transmissions that are already transmitted in the source cell, but not successfully acknowledged, will be retransmitted in the target cell. No data is lost in the WTRU. For proper combining in the target cell, it necessary to set the new data indicator for all new transmissions in the target cell, including transmissions that were already attempted without success in the source cell.

The re-ordering buffer 315 located at the RNC 310 is not affected by an EU-DCH inter-Node-B serving cell change (hard handover). A re-ordering buffer does not need to be flushed in the source Node-B and reinitialized in the target Node-B. In-sequence delivery can therefore be maintained. Transmissions attempted in a source cell but not yet successfully acknowledged are reinitiated in a new cell without loss of data.

The WTRU performs several actions after an EU-DCH inter-Node-B serving cell change. Since TSNs are maintained, the MAC entity that handles EU-DCH functionalities in the WTRU does not need to reset the HARQ processes. All it needs to do is to set "new data indicator" for data blocks that are not ACKed by the source Node-B by the time of an EU-DCH inter-Node-B serving cell change. The sequence numbers of those data blocks are kept the same. For transmission of other new data in the target cell, the WTRU starts the sequence number after the sequence number where it stopped in the source Node-B by the time of an EU-DCH inter-Node-B serving cell change. TSNs are not affected by the cell change.

Figure 4:
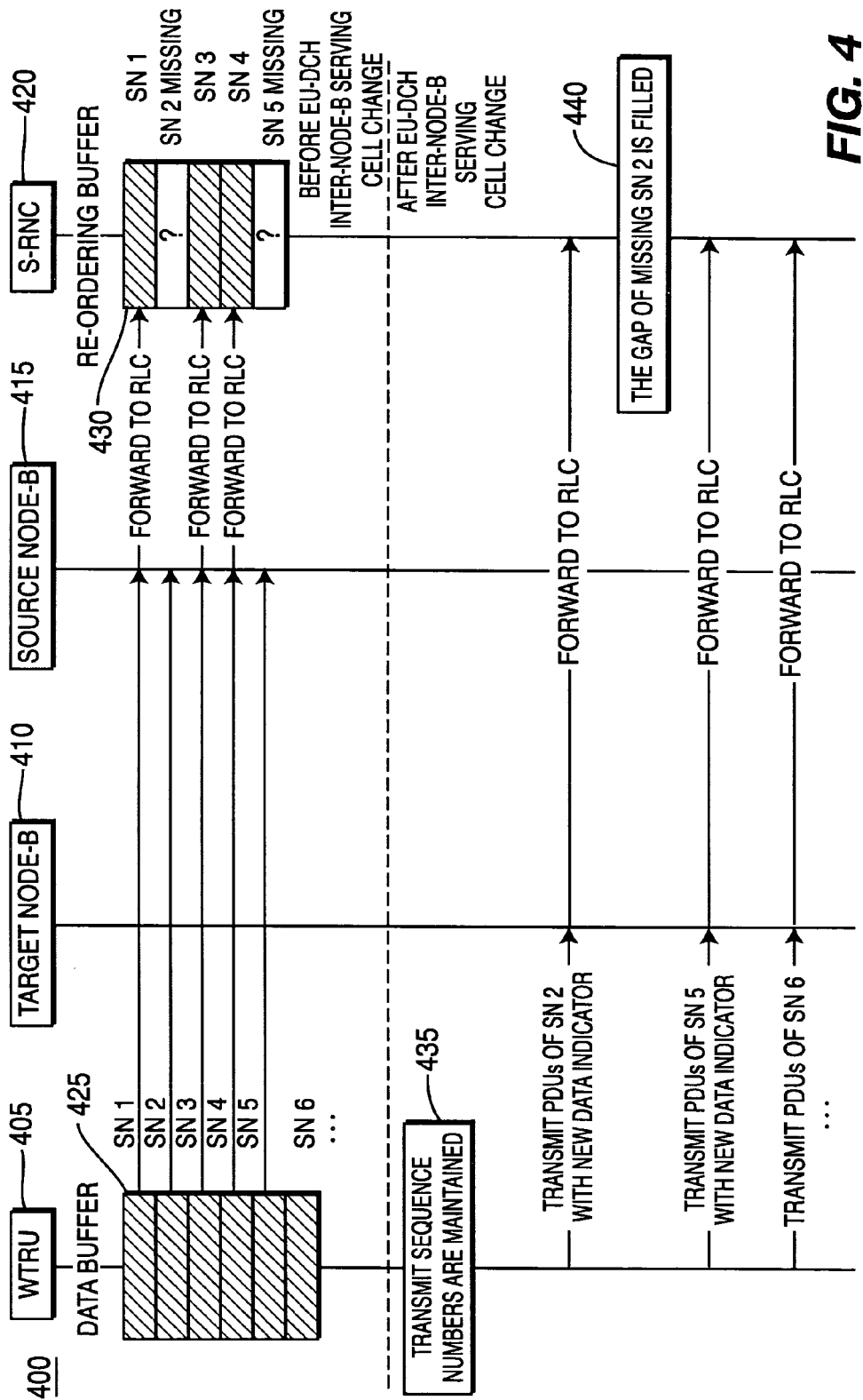
FIG. 4 is a signal flow diagram depicting an example of the operation of a wireless communication system during EU serving cell change in accordance with the present invention.

FIG. 4 is a signal flow diagram depicting an example of the operation of a wireless communication system 400 during an EU-DCH inter-Node-B serving cell change. The wireless communication system 400 includes a WTRU 405, a target Node-B 410, a source Node-B 415 and an S-RNC 420.

Before the EU inter-Node-B serving cell is changed, PDUs with SNs 1-5 are transmitted from a data buffer 425, located in the WTRU 405, to the source Node-B 415. However, in the example shown in FIG. 4, only SNs 1, 3 and 4 are received correctly by the source Node-B 415 and forwarded to a re-ordering buffer 430 in the S-RNC 420. The PDUs with SNs 2 and 5 are missing. After the EU-DCH inter-Node-B serving cell change, the same SNs are maintained (step 435) and the WTRU 405 retransmits PDUs with SNs 2 and 5 to the target Node-B 410 (i.e., target cell) with a new data indicator set. Based on the SN where transmission stopped in the source cell (i.e., SN 5), the WTRU 405 increments the SN (starting from SN 6) for other new data in the target cell. The gap of missing SN is filled at the S-RNC 420 (step 440).

Figure 2:
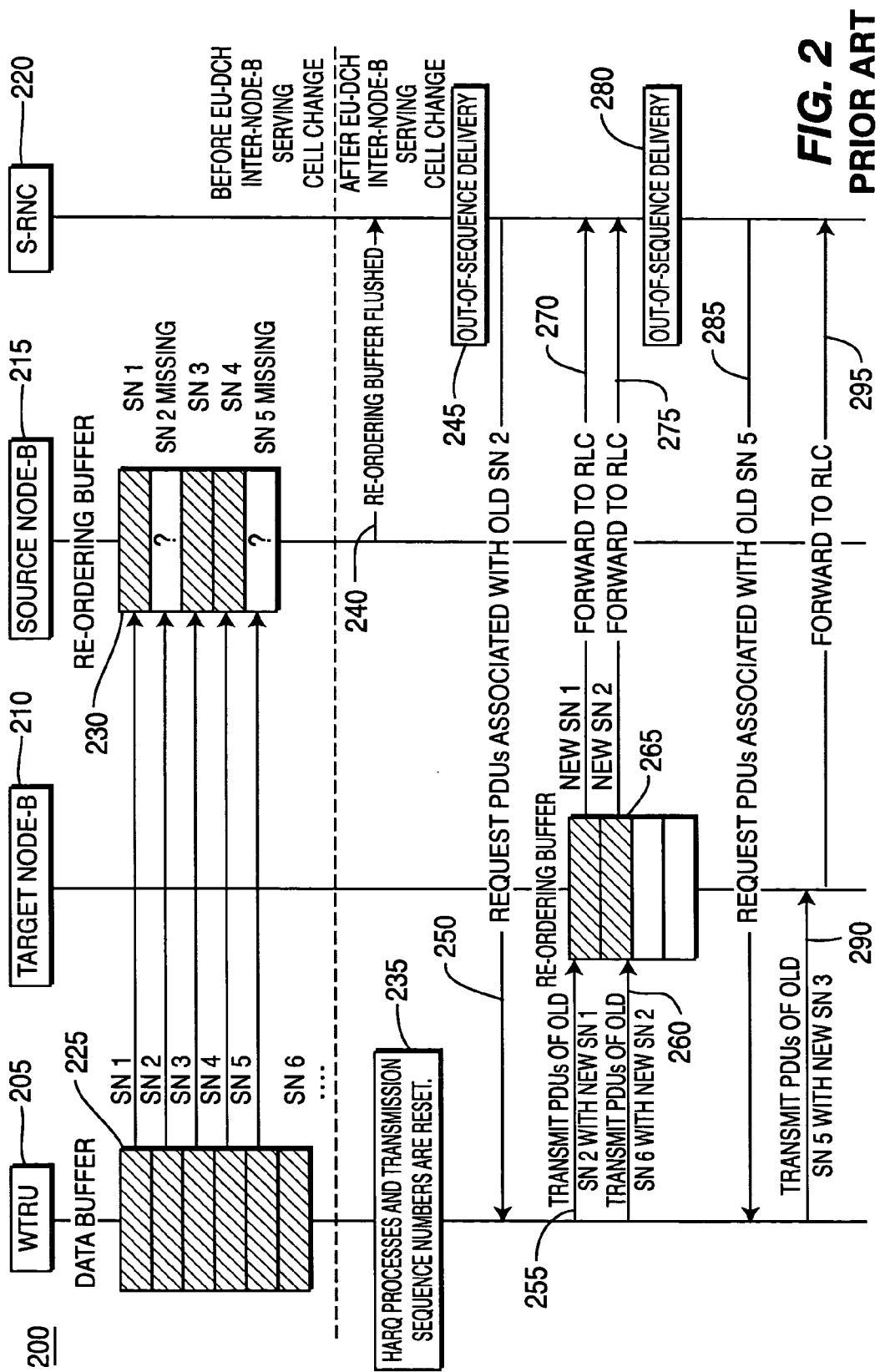

The present invention dramatically reduces delay as compared to the delay experienced by the conventional wireless systems 100 and 200, shown in FIGS. 1 and 2, respectively.

Figure 5:
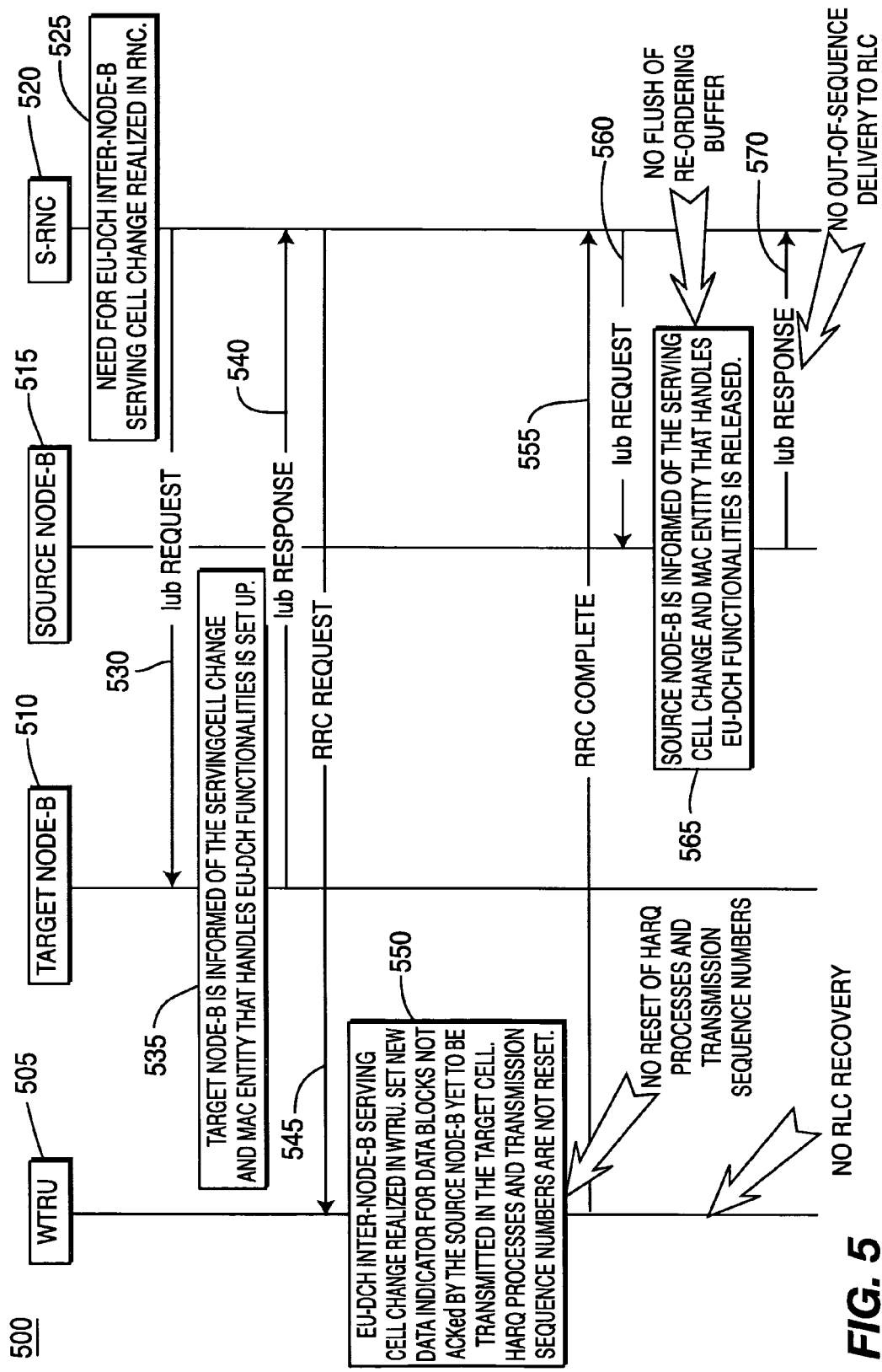
FIG. 5 is a signal flow diagram depicting the operation of a wireless communication system before, during and after an EU-DCH inter-Node-B serving cell change in accordance with the present invention.

FIG. 5 is a signal flow diagram depicting signaling for a wireless communication system 500 before, during and after an EU-DCH inter-Node-B serving cell change (hard-handover) in accordance with the present invention. The wireless communication system 500 includes a WTRU 505, a target Node-B 510, a source Node-B 515 and an S-RNC 520. A re-ordering buffer 315 is located at the S-RNC 520.

Still referring to FIG. 5, when the S-RNC 520 realizes a need for an EU-DCH inter-Node-B serving cell change (step 525), the S-RNC sends an Iub request message 530 to the target Node-B 510. The target Node-B 510 is informed of the cell change and a MAC entity that handles EU-DCH functionalities is set up in the target Node-B 510 (step 535). The target Node-B sends an Iub response message 540 to the S-RNC 520 which, in turn, sends an RRC request message to the WTRU 505. In step 550, the EU-DCH inter-Node-B serving cell change is realized in the WTRU 505 and a "new data indicator" is set for data blocks that are not ACKed by the source Node-B 515 yet for transmission in the target cell.

In system 500, the HARQ processes and SNs are maintained at the WTRU during hard handover, unlike in the conventional systems 100 and 200 shown in FIGS. 1 and 2, respectively, in which the HARQ processes and SNs are reset at the WTRU during hard handover. The WTRU 505 then sends an RRC complete message 555 to the S-RNC 520 which, in turn, sends an Iub request message 560 to the source Node-B 515. The source Node-B is informed of the cell change and the MAC entity that handles the EU-DCH functionalities in the source Node-B 515 is released (step 565).

The wireless communication system 500 is advantageous over the conventional systems 100 and 200 depicted in FIGS. 1 and 2 because the re-ordering buffer 315 in the S-RNC 520 is not flushed during the EU-DCH inter-Node-B serving cell change. Additionally, as previously mentioned, in the target cell the SNs and H-ARQ processes within the WTRU 505 are not reset and only the new data indicator is set for data blocks that are not ACKed by the source Node-B by the time of an EU-DCH inter-Node-B serving cell change. No out-of-sequence delivery to the RLC and no RLC recovery (on the WTRU side) are caused by the EU-DCH inter-Node-B serving cell change.

Figure 6:
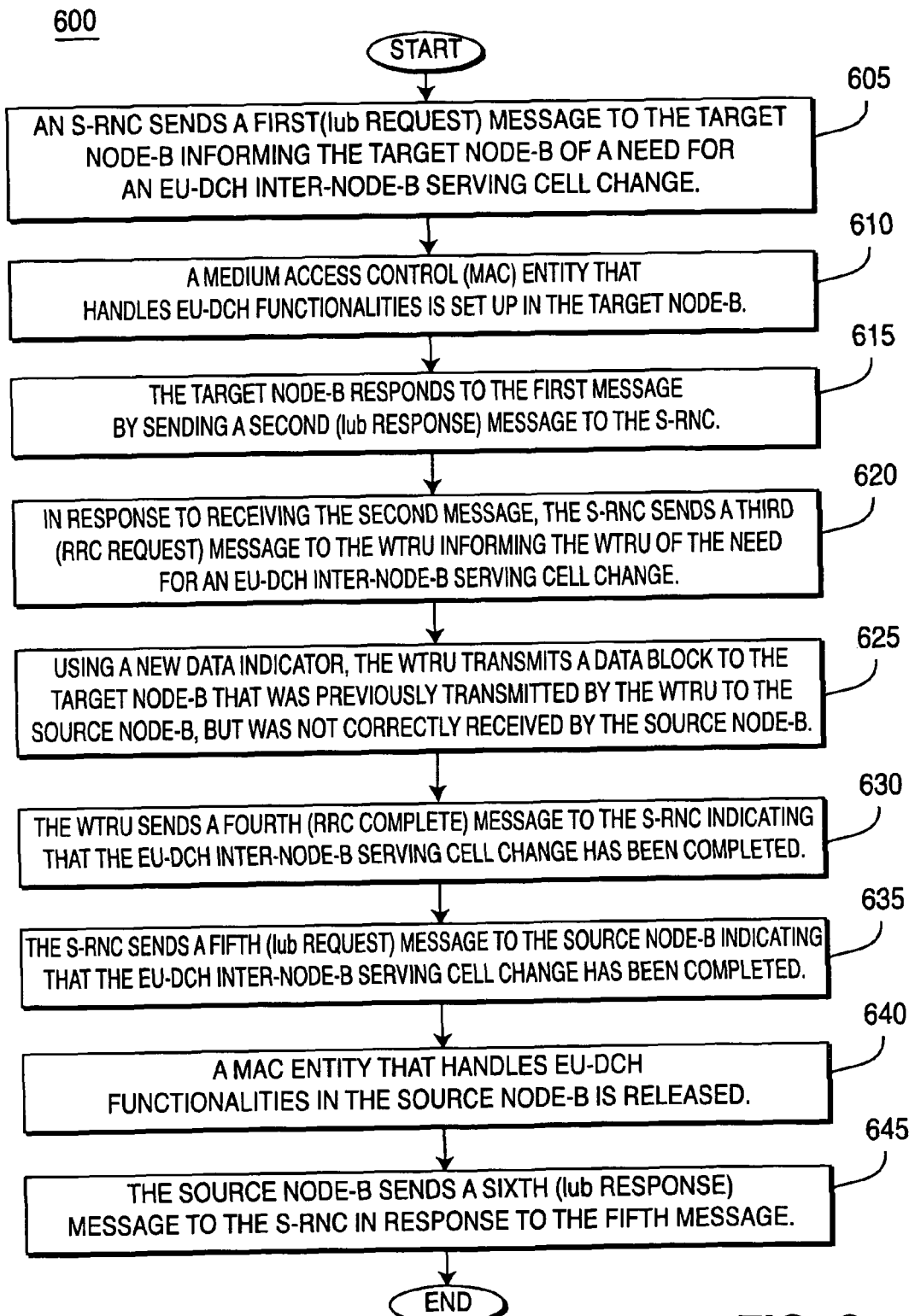
FIG. 6 is a flow chart of a process including method steps for supporting an EU-DCH inter-Node-B serving cell change in accordance with the present invention.

FIG. 6 is a flow chart of a process 600 including method steps for supporting an EU-DCH inter-Node-B serving cell change in accordance with the present invention. In step 605, the S-RNC 520 sends a first (Iub request) message 530 to the target Node-B 510 informing the target Node-B 510 of a need for an EU-DCH inter-Node-B serving cell change. In step 610, a MAC entity that handles EU-DCH functionalities is set up in the target Node-B 510. In step 615, the target Node-B responds to the first message by sending a second (Iub response) message to the S-RNC 520. In response to receiving the second message, the S-RNC 520 sends a third (RRC request) message to the WTRU 505 informing the WTRU 505 of the need for an EU-DCH inter-Node-B serving cell change (step 620). By using a new data indicator, the WTRU 505 transmits a data block to the target Node-B 510 that was previously transmitted by the WTRU 505 to the source Node-B 515, but was not correctly received by the source Node-B 515 (step 625).

Still referring to FIG. 6, the WTRU 505 sends a fourth (RRC complete) message to the S-RNC indicating that the EU-DCH inter-Node-B serving cell change has been completed (step 630). In step 635, the S-RNC 520 sends a fifth (Iub request) message to the source Node-B 515 indicating that the EU-DCH inter-Node-B serving cell change has been completed. In step 640, the MAC entity in the source Node-B is released. Finally, in step 645, the source Node-B 515 sends a sixth (Iub response) message to the S-RNC 520 in response to the fifth message.

While the present invention has been described in terms of the preferred embodiment, other variations which are within the scope of the invention as outlined in the claims below will be apparent to those skilled in the art.

What is claimed is:

1. A method of supporting a serving cell change from a source Node-B to a target Node-B implemented in a wireless transmit/receive unit (WTRU), the method comprising:

receiving from the source Node-B a plurality of resource allocations associated with a first serving cell;

transmitting, in response to the receipt of the plurality of resource allocations from the source Node-B, a first sequence of protocol data units (PDUs) to at least the source Node-B, wherein each PDU is assigned a respective sequence number;

receiving a radio resource control (RRC) message indicating a serving cell change from the source Node-B to the target Node-B, wherein the source Node-B is a single Node-B and the target Node-B is a single Node-B, wherein the serving cell change is an enhanced uplink dedicated channel (EU-DCH) inter-Node-B serving cell change;

receiving from the target Node-B a plurality of resource allocations associated with a second serving cell in response to the received RRC message;

setting an indicator for transmitted PDUs that have not been acknowledged by the source Node-B;

transmitting, in response to the receipt of the plurality of resource allocations from the target Node-B, a second sequence of PDUs to at least the target Node-B, wherein each PDU corresponds to a PDU in the first sequence indicated as not being acknowledged by the source Node-B, and each PDU maintains the same sequence number assigned to the corresponding PDU in the first sequence; and transmitting a message indicating completion of the EU-DCH inter-Node-B serving cell change.

2. The method of claim 1 further comprising:

sending a message to a serving radio network controller (S-RNC) indicating that the serving cell change has been completed.

3. A wireless transmit/receive unit (WTRU) comprising:

a receiver configured to receive a plurality of resource allocations associated with a first serving cell from a source Node-B;

a transmitter configured, in response to the receipt of the plurality of resource allocations from the source Node-B, to transmit a first sequence of protocol data units (PDUs) to at least the source Node-B, wherein each PDU is assigned a respective sequence number;

the receiver further configured to receive a radio resource control (RRC) message indicating a need for a serving cell change from the source Node-B to a target Node-B, wherein the source Node-B is a single Node-B and the target Node-B is a single Node-B, wherein the serving cell change is an enhanced uplink dedicated channel (EU-DCH) inter-Node-B serving cell change;

the receiver further configured to receive a plurality of resource allocations associated with a second serving cell from the target Node-B in response to the received RRC message;

a processor configured to set an indicator for transmitted PDUs that have not been acknowledged by the source Node-B;

the transmitter further configured, in response to the receipt of the plurality of resource allocations from the target Node-B, to transmit a second sequence of PDUs to at least the target Node-B, each PDU corresponds to a PDU in the first sequence indicated as not being acknowledged by the source Node-B, and each PDU maintains the same sequence number assigned to the corresponding PDU in the first sequence; and the transmitting further configured to transmitting a message indicating completion of the EU-DCH inter-Node-B serving cell change.

4. The WTRU of claim 3 wherein the transmitter is further configured to send a message to a serving radio network controller (S-RNC) indicating that the serving cell change has been completed.

* * * * *

UNITED STATES PATENT AND TRADEMARK OFFICE
CERTIFICATE OF CORRECTION

PATENT NO. : 8,102,788 B2  
APPLICATION NO. : 10/945355  
DATED : January 24, 2012  
INVENTOR(S) : Zhang et al.

It is certified that error appears in the above-identified patent and that said Letters Patent is hereby corrected as shown below:

ON THE TITLE PAGE

At item (56) OTHER PUBLICATIONS, page 2, right column, on the fifteenth line, after "3GPP TS 25.321 v4.9.0", delete "(Sep. 2009)." and insert --(Sep. 2003).--.

IN THE SPECIFICATION

At column 2, line 59, after "re-ordering buffer", delete "285" and insert --265--.

At column 2, line 60, after "Node-B 210 (step", delete "285" and insert --255--.

At column 2, line 62, after "re-ordering buffer", delete "285" and insert --265--.

At column 2, line 63, after "210 (step", delete "258" and insert --260--.

At column 2, line 64, after "(respective steps", delete "285 and 285" and insert --270 and 275--.

At column 2, line 65, after "step", delete "285" and insert --280--.

At column 3, line 4, after "buffer", delete "285" and insert --265--.

At column 4, line 60, after "in the target cell, it" insert --is--.

Signed and Sealed this  
Thirteenth Day of August, 2013

Teresa Stanek Rea  
*Acting Director of the United States Patent and Trademark Office*